Jan. 26, 1932.  S. N. JOHNSON  1,842,832
ARMATURE WINDING TOOL
Filed Nov. 19, 1930  2 Sheets-Sheet 1

Inventor
Sigurd N. Johnson
By Spencer Hardman & Fehr
his Attorneys

Patented Jan. 26, 1932

1,842,832

UNITED STATES PATENT OFFICE

SIGURD N. JOHNSON, OF ANDERSON, INDIANA, ASSIGNOR TO DELCO-REMY CORPORATION, OF ANDERSON, INDIANA, A CORPORATION OF DELAWARE

ARMATURE WINDING TOOL

Application filed November 19, 1930. Serial No. 496,610.

This invention relates to improvements in tools for use in connection with winding armatures for dynamo electric machines. More particularly, the present invention relates to improvements in the type of tools disclosed in the copending application of Alva W. Phelps, Serial No. 410,089, filed November 27, 1929. This tool comprises a hollow handle, adapted to be mounted on the end of an armature shaft, which extends from the armature core, which is clamped against the wire guiding head of an armature winding machine. The tool remains on the shaft, while it is rotating with the armature core, about an axis at right angles, to the shaft during the operation of winding a coil of wire into certain spaced slots of the armature core. It is the function of the tool, to provide means for forming a loop of wire between successive coils, wound upon the armature core and for severing the loop into unequal portions in order to distinguish the ending portion of a coil previously wound, with the starting portion of a coil next to be wound.

It is an object of the present invention to simplify the construction of a tool of this type, in order to reduce the cost of manufacture.

Further objects and advantages of the present invention will be apparent from the following description, reference being had to the accompanying drawings wherein a preferred embodiment of one form of the present invention is clearly shown.

Figure 4:
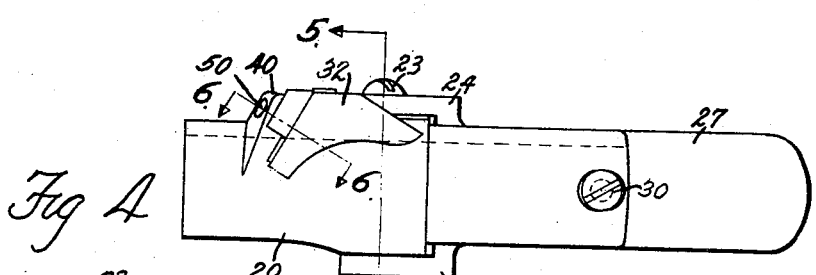
Fig. 4 is a side elevation viewed in the direction of the arrow 4 of Fig. 2.
Figure 5:
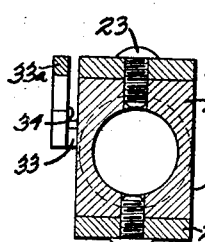
Figure 6:
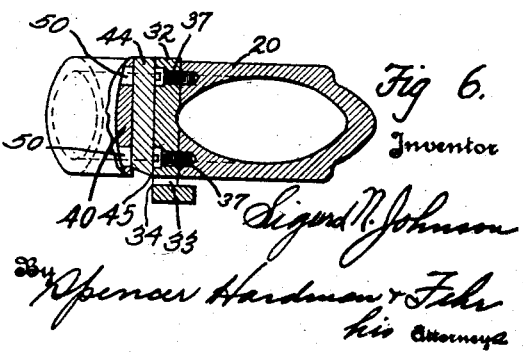

Figs. 5 and 6 are sectional views taken on the lines 5—5 and 6—6 of Fig. 4, respectively.

Figure 1:
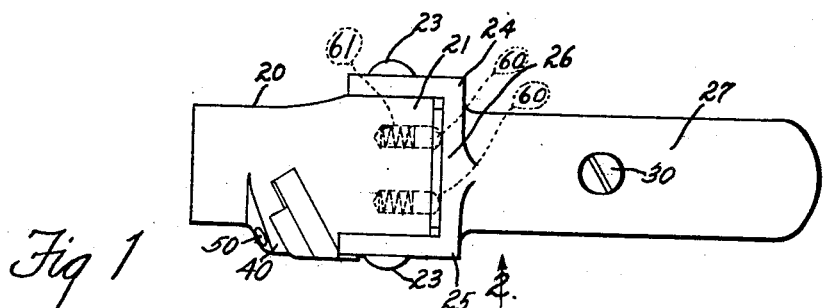
Fig. 1 is a side elevation of a tool embodying the present invention.
Figure 2:
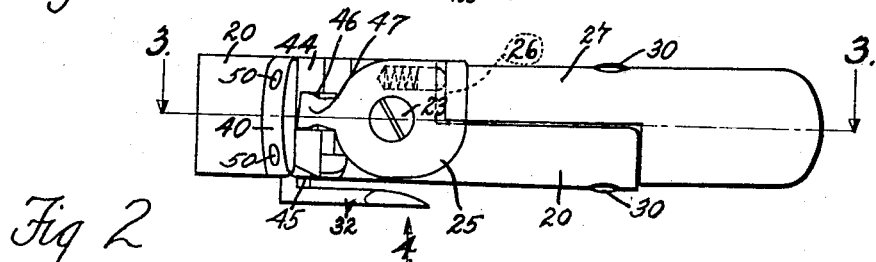
Fig. 2 is a side elevation viewed in the direction of the arrow 2 in Fig. 1.
Figure 3:
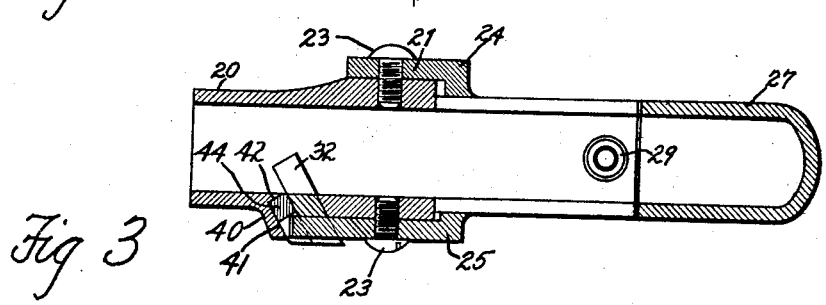
Fig. 3 is a sectional view on the line 3—3 of Fig. 2.
Figure 7:
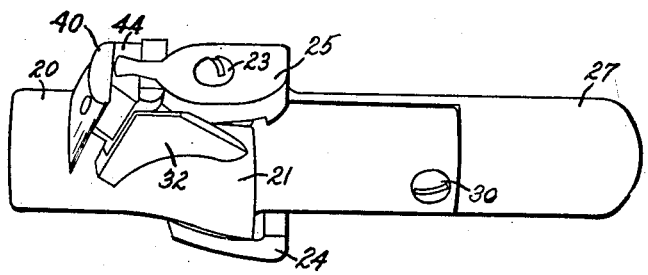

Fig. 7 is a perspective view of the tool showing in perspective the two elevations shown in Figs. 1 and 2.

Figure 8:
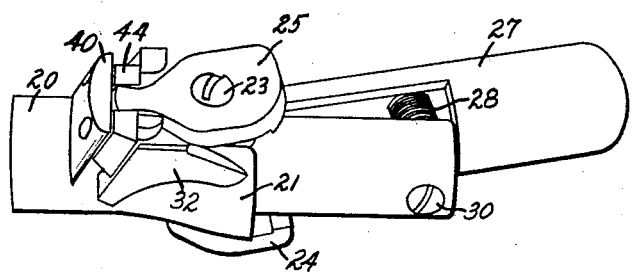

Fig. 8 is a view similar to Fig. 7, showing a portion of the handle moved to operate the cutting knife.

Figure 9:
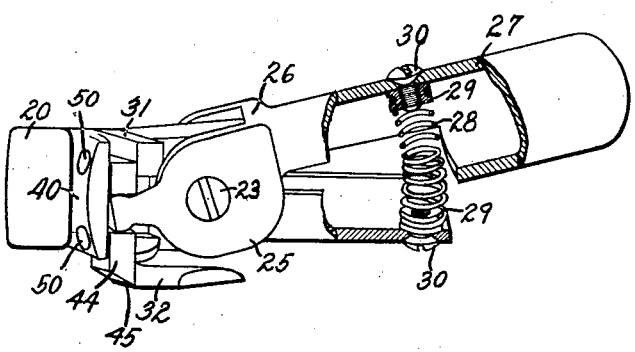

Fig. 9 is a perspective view, partly in section showing the handle in the same position as shown in Fig. 8.

Figure 10:
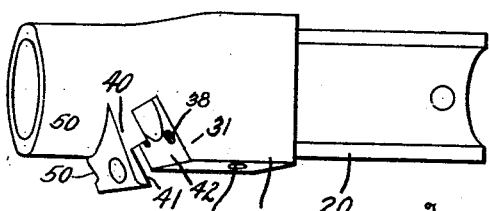

Fig. 10 is a perspective view of one of the handle members.

Figure 11:
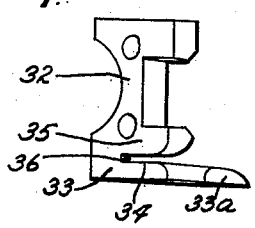

Fig. 11 is a perspective view of a part which provides the wire loop forming hook, and the stationary wire cutting shear blade.

The tool comprises a relatively stationary handle member 20 of tubular formation providing a pivot block portion 21 having diametrically opposite tapped holes 22 for receiving trunnion screws 23 which pivotally connect arms 24 and 25 extending from the yoke portion 26 of a relatively movable handle portion 27 of tubular formation. These handle portions are normally maintained in the relation shown in Figs. 1, 2, 3, 4 and 7 by a spring 28 which resists movement of the handle portion 27 into the position shown in Figs. 8 and 9. This spring has its ends attached to nut members 29 which are attached respectively to the handle members 20 and 27 by screws 30.

The handle member 20 provides a shelf 31 or ledge which is inclined to the axis of the handle. As this shelf 31 receives a shear blade and hook member 32, the hook being indicated at 33 and the shearing edge at 34. The main portion 35 of the member 32 is separated from the hook portion 33 by a notch 36 which receives the wire looped around the hooked portion 33. The hooked portion 33 provides an extension 33a of substantial length so that when the wire has been once looped around the hooked portion 33 it will not be readily disengaged therefrom. The part 32 is attached to the shelf 31 by screws 37 which pass through counterbored holes in the part 32 and which are screwed into tapped holes 38 in the shelf 31. The handle member 20 is provided with a flange 40 which is provided with a surface 41 parallel to the part 32 when secured to the handle member 20. The surface 41 is at right angles to a surface 42 provided by the handle member 20. The surfaces 41, 42 and the plane surface of the part 32 opposite to the surface 41 cooperate to provide a guide for a movable shear blade 44 having a cutting edge 45 which cooperates with a shearing edge 34 of the part 32. The blade 44 is provided with a notch 46 for receiving an extension 47 of the arm 25 of the movable handle member 27. When the movable handle member 27 is moved into the position shown in Figs. 8 and 9 a loop of wire passed around the hooked portion 33 of the part 32 will be severed by the cooperating shearing edges 45 and 34. When the handle is released the spring 28 will be operative to bring the handle members together and to retract the shear blade 44 from the hooked portion 33.

When assembling the tool the part 32 is first attached to the handle portion 20. The screws 37 are passed through holes 50 provided in the flange 40 in alignment with the tapped holes 38 in the shelf 31. Then the blade 44 is placed in the notch defined by the surfaces 41, 42 and the outer surface of the part 32. Then the handle member 27 to which one end of the spring 28 has been attached is assembled with the handle member 20 and pivotally connected therewith by the trunnion crews 23. Then the other end of the spring 28 is secured to the handle member 20.

Instead of employing the spring 28 to bring the handle members together and to retract the shear blade 44 from the hook 33 there may be substituted two spring urged plungers 60 guided by the trunnion block portion 21 of the handle 20 and yieldingly pressed by spring 61 against the yoke portion 26 of the handle 27 as shown in Figs. 1 and 2. The latter construction is preferable especially if the tool is to be used on an armature shaft of such length that the shaft will be required to extend into the tubular recess in the handle portion 27.

While the form of embodiment of the present invention as herein disclosed, constitutes a preferred form, it is to be understood that other forms might be adopted, all coming within the scope of the claims which follow.

What is claimed is as follows:

1. A wire-loop-forming and loop cutting tool for use in winding armatures of dynamo electric machines, comprising in combination, a tubular handle adapted to receive the end of a dynamo armature shaft extending from the core of the armature to be wound, said handle comprising pivotally connected, relative stationary and movable members; a hardened metal part providing a wire-loop-forming hook and providing a guide for a movable shear blade and providing a stationary shear blade, said part being attached to the relatively stationary handle member, a relatively movable shear blade guided by said part, and means connecting the movable shear blade and movable handle member.

2. A wire-loop-forming and loop cutting tool for use in winding armatures of dynamo electric machines, comprising in combination, a tubular handle adapted to receive the end of a dynamo armature shaft extending from the core of the armature to be wound, said handle comprising pivotally connected, relative stationary and movable members, the stationary member providing a trunnion block, and the movable member a forked portion having arms pivotally attached by trunnions to opposite sides of the trunnion block; a hardened metal part providing a wire-loop-forming hook and providing a stationary shear blade, said part being attached to a surface of the trunnion block located transversely with respect to the axis of the handle; a flange provided by the trunnion block and having a surface which cooperates with the adjacent surface of said part to provide guides for a movable shear blade, a movable shear blade reciprocatable between said guides and having a notch; and an extension from one of the arms of the movable handle member located in the notch of the movable shear blade so that said shear blade will be moved by the movable handle and so that the movable shear blade will be retained between the guides.

In testimony whereof I hereto affix my signature.

SIGURD N. JOHNSON.